(12) United States Patent  
Nitta

(10) Patent No.: US 7,058,025 B2  
(45) Date of Patent: Jun. 6, 2006

(54) APPARATUS FOR PROVIDER CONNECTION AND MOBILE COMMUNICATION SYSTEM

(75) Inventor: Toshio Nitta, Tokyo (JP)

(73) Assignee: NEC Corporation, Tokyo (JP)

( * ) Notice: Subject to any disclaimer, the term of this patent is extended or adjusted under 35 U.S.C. 154(b) by 950 days.

(21) Appl. No.: 09/987,814

(22) Filed: Nov. 16, 2001

(65) Prior Publication Data

US 2002/0061002 A1 May 23, 2002

(30) Foreign Application Priority Data

Nov. 21, 2000 (JP) ............................. 2000-354551

(51) Int. Cl.  
*H04L 12/28* (2006.01)

(52) U.S. Cl. ...................... 370/255; 370/400; 370/401; 370/403; 370/437; 370/441; 455/421; 455/422.1; 455/423; 455/459; 455/466

(58) Field of Classification Search ...................... None  
See application file for complete search history.

(56) References Cited

U.S. PATENT DOCUMENTS 6,658,266 B1 * 12/2003 Inokura et al. .......... 455/553.1

2001/0055308 A1 * 12/2001 Afrakhteh et al. .......... 370/401

FOREIGN PATENT DOCUMENTS

| EP | 0 823 827 A2 | 2/1998 |
| JP | 8-331035 A | 12/1996 |
| JP | 9-200861 A | 7/1997 |
| JP | 10-336751 A | 12/1998 |
| WO | WO 98/46035 | 10/1998 |

* cited by examiner

*Primary Examiner*—Wellington Chin  
*Assistant Examiner*—Raj Jain  
(74) *Attorney, Agent, or Firm*—Sughrue Mion, PLLC

(57) ABSTRACT

A PRV-IWF 109 includes an FIN+ACK-DET circuit 205 for discriminating a message in a TCP/IP packet sent from an AS 110, and detecting an end of a data transfer, an ACK-DET circuit 206 for discriminating a message in a TCP/IP packet sent from a DTE 101, and detecting that the DTE 101 has recognized an end of a data transfer, and a line signal transmitting and receiving circuit 207 for providing an indication to an MSC 106 via a signal repeating device to release talking channels for TCP/IP data communication within a mobile communication network in case that a value of a logical product of the detection results of both circuits 205 and 206 is true.

14 Claims, 7 Drawing Sheets

APPARATUS FOR PROVIDER CONNECTION AND MOBILE COMMUNICATION SYSTEM

BACKGROUND OF THE INVENTION

The present invention relates to an apparatus for provider connection, a mobile communication system, and a mobile TCP/IP (Transmission Control Protocol/internet Protocol: protocols of a transport layer and a network/internet work layer (a protocol of an internet)) data communication method, and especially, to an apparatus for provider connection, a mobile communication system, and a mobile TCP/IP data communication method that are preferable in case of making a finite radio frequency band effectively available.

Conventionally, as one example of an internet connection form in a mobile data communication system, there is an example shown in FIG. 6. A mobile communication system in a conventional example includes a communication terminal on a mobile device side (DTE: Data Terminal Equipment) 601, an adapter for TCP/IP data communication on a mobile device side (MS-ADP: Mobile Station Adapter) 602, a mobile communication terminal (MS: Mobile Station) 603, a wireless base station (BTS: wireless Base Terminal Station) 604, a wireless base station controller (BSC: Base Station Controller) 605, a mobile switch (MSC: Mobile systems Switching Center) 606 having a time-division switch (TDNW: Time Division Node) 607, a call processor (CP: Call Processor) 608 and an inter-working function device (HPM-IWF: Hyper Marked-Inter Working Function) 609, and an access server (AS: Access Server) 610. In the figure, 611 is an internet service provider (ISP: Internet Service Provider), and 612 is an internet (Internet).

In the mobile communication system in the conventional example, in case that the data terminal equipment (DTE) 601 conducts TCP/IP communication with a terminal of the internet 612, by means of a keyboard operation of the data terminal equipment (DTE) 601, a telephone number addressed to the HPM-ADP 609 is input to originate a call, and similarly, in case of voice communication, setting of user data transfer channels (communication channels) between the mobile communication terminal (MS) 603 and the HPM-ADP 609 is conducted.

This setting of the user data transfer channels (communication channels) is conducted by control channels between the mobile communication terminal (MS) 603, the BTS 604, the BSC 605 and the CP 608 of the MSC 606, and as a result of resource management of a wireless line, resource management of an approach link that is a wire line, and resource management of each device and channel within the MSC 606, the most suitable channel is allocated.

The mobile communication terminal adapter (MS-ADP) 602 is connected to the mobile communication terminal (MS) 603 for conducting voice communication as an accessory device, and is for making it possible to provide a data communication service to the mobile communication terminal (MS) for the voice communication, and conducts inter-conversion between a data communication form (in general, a communication form by means of a serial start-stop synchronous method) with the data terminal equipment (DTE) 601 and a data communication form (in general, a communication method by means of a transmission error controlling method on a wireless line side) that is needed by the mobile communication terminal (MS) 603 to conduct data communication.

When the setting of the user data transfer channels (communication channels) is completed, the contents of data sent from the data terminal equipment (DTE) 601 become the same as the contents of data output from the HPM-ADP 609 to the AS 610 as if the data terminal equipment (DTE) 601 were directly connected to the AS 610.

The AS 610 is a device for inter-converting a serial data form represented by an RS232-C or the like and a data form of a TCP/IP type into each other, and the numbers of input and output terminals on a serial data side and IP addresses used in the data form of the TCP/IP type correspond to each other one by one. By these functions, the data terminal equipment (DTE) 601 can perform as if it were existing in a net of the internet 612, and makes all applications that operate on a TCP/IP protocol operate seamlessly.

Next, when data communication ends, there are a case where the communication ends by means of a keyboard operation in the data terminal equipment 601 and a case where the communication ends by operating an on-hook key of the mobile communication terminal (MS) 603, and in either case, the release of the user data transfer channels (communication channels) is conducted by means of the control channels between the mobile communication terminal (MS) 603, the BTS 604, the BSC 605, and the CP 608 of the MSC 606.

Also, in order to realize the internet connection in the mobile data communication system in the conventional example, as shown in FIG. 7, the above-described inter-working function device (HPM-IWF) 609 includes an ARQ-RX circuit 701 and an ARQ-TX circuit 702 for terminating a transmission error control protocol on a wireless line side, an ASYNC-TX circuit 703 and an ASYNC-RX circuit 704 for terminating communication on a serial communication line with an access server on an ISP side, and a line signal transmitting and receiving circuit (Line Signal Circuit) 705.

Also, in order to realize the internet connection in the mobile data communication system in the conventional example, as shown in FIG. 7, the above-described inter-working function device (HPM-IWF) 609 includes an ARQ-RX circuit 701 and an ARQ-TX circuit 702 for terminating a transmission error control protocol on a wireless line side, an ASYNC-TX circuit 703 and an ASYNC-RX circuit 704 for terminating communication on a serial communication line with an access server on an ISP side, and a line signal transmitting and receiving circuit (Line Signal Circuit) 705.

However, in the above-mentioned conventional example, there are tasks as follows:

In the mobile communication system of the above-describe conventional example, in case of providing a TCP/IP (Transmission Control Protocol/Internet Protocol) communication service, even in non-communication, it is necessary to make the wireless line device in use, and there is a task in which a statistical multiplexing effect by means of packet multiplexing cannot be effectively obtained.

SUMMARY OF THE INVENTION

The present invention is made to solve the above-mentioned problems.

Another objective of the present invention is to provide an apparatus for provider connection, a mobile communication system, and a mobile TCP/IP data communication method, in which communication channels can be released during non-communication of TCP/IP data communication.

The present invention is an apparatus for provider connection, in a mobile communication system including a communication terminal on a mobile device side, a mobile device, an adapter for mobile data communication, a mobile switch and an access server, which is provided in the above-described mobile switch, characterized in that the apparatus comprises a first detection circuit for discriminating a message in a TCP/IP packet sent from the above-described access server and detecting an end of data transfer, a second detection circuit for discriminating a message in a TCP/IP packet sent from the above-described communication terminal on a mobile device side, which is connected to the above-described mobile device and the above-described adapter for mobile data communication, and detecting that the above-described communication terminal on a mobile device side has recognized an end of data transfer, and a line signal transmitting and receiving circuit for providing an indication to the above-described mobile switch via a signal repeating device based on detection results of the above-described first and the above-described second detection circuits to release talking channels for TCP/IP data communication within a mobile communication network.

Also, the present invention is an apparatus for provider connection, in a mobile communication system including a communication terminal on a mobile device side, a mobile device, an adapter for mobile data communication, a mobile switch and an access server, which is provided in the above-described mobile switch, characterized in that the apparatus comprises a first detection circuit for discriminating a message in a TCP/IP packet sent from the above-described communication terminal on a mobile device side, which is connected to the above-described mobile device and the above-described adapter for mobile data communication, and detecting an end of data transfer, a second detection circuit for discriminating a message in a TCP/IP packet sent from the above-described access server and detecting that a communication terminal on an internet side has recognized an end of data transfer, and a line signal transmitting and receiving circuit for providing an indication to the above-described mobile switch via a signal repeating device based on detection results of the above-described first and the above-described second detection circuits to release talking channels for TCP/IP data communication within a mobile communication network.

Also, if it is explained by referring to FIG. 1, an apparatus for provider connection of the present invention is, in a mobile communication system including a communication terminal (101) on a mobile device side, a mobile device (103), an adapter (102) for mobile data communication, a mobile switch (106) and an access server (110), which is provided in the above-described mobile switch, characterized in that the apparatus (109) for provider connection comprises a first detection circuit (205) for discriminating a message in a TCP/IP packet sent from the above-described access server and detecting an end of data transfer, a second detection circuit (206) for discriminating a message in a TCP/IP packet sent from the above-described communication terminal on a mobile device side, which is connected to the above-described mobile device and the above-described adapter for mobile data communication, and detecting that the above-described communication terminal on a mobile device side has recognized an end of data transfer, and a line signal transmitting and receiving circuit (207) for providing an indication to the above-described mobile switch via a signal repeating device based on detection results of the above-described first and the above-described second detection circuits to release talking channels for TCP/IP data communication within a mobile communication network.

Also, the present invention is a mobile TCP/IP data communication method in a mobile communication system including a communication terminal on a mobile device side, a mobile device, an adapter for mobile data communication, a mobile switch and an access server, characterized in that:

a message in a TCP/IP packet sent from said access server is discriminated, and an end of data transfer is detected;

a message in a TCP/IP packet sent from said communication terminal on a mobile device side, which is connected to said mobile device and said adapter for mobile data communication, is discriminated, and it is detected that said communication terminal on a mobile device side has recognized an end of data transfer; and in case that a value of a logical product of the detection results of said first and said second detection circuits is true, an indication is provided to said mobile switch via a signal repeating device to release talking channels for TCP/IP data communication within a mobile communication network.

Also, the present invention is a mobile TCP/IP data communication method in a mobile communication system including a communication terminal on a mobile device side, a mobile device, an adapter for mobile data communication, a mobile switch and an access server, characterized in that:

a message in a TCP/IP packet sent from said communication terminal on a mobile device side, which is connected to said mobile device and said adapter for mobile data communication, is discriminated, and an end of data transfer is detected;

a message in a TCP/IP packet sent from said access server is discriminated, and it is detected that a communication terminal on an internet side has recognized an end of data transfer; and in case that a value of a logical product of the detection results of said first and said second detection circuits is true, an indication is provided to said mobile switch via a signal repeating device to release talking channels for TCP/IP data communication within a mobile communication network.

According to the apparatus for provider connection of the present invention, it becomes possible to effectively use a finite radio frequency band that is used by the mobile communication system. Also, by means of a statistical multiplexing effect in the TCP/IP data communication, it is possible to reduce the number of devices for data communication, which are provided in the mobile switch.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

First Embodiment

Next, referring to drawings, a first embodiment of the present invention will be explained in detail.

(1) Explanation of an Arrangement

Figure 1:
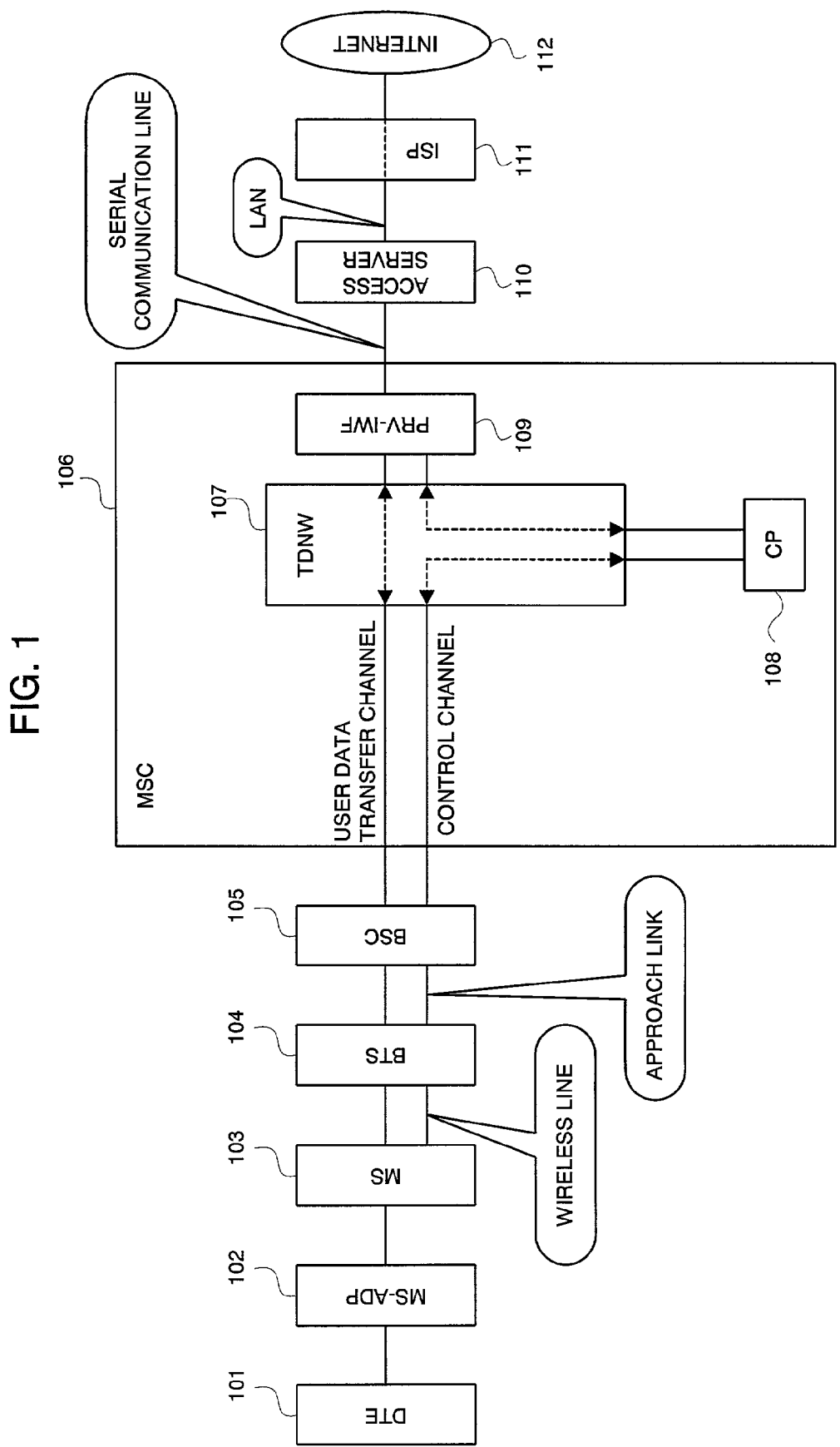
FIG. 1 is a block diagram showing a whole arrangement of a mobile communication system in the first embodiment of the present invention.

As shown in FIG. 1, a mobile communication system in the first embodiment of the present invention includes a communication terminal on a mobile device side (DTE) 101, an adapter for TCP/IP data communication on a mobile device side (MS-ADP) 102, a mobile communication terminal (MS) 103, a wireless base station (BTS) 104, a wireless base station controller (BSC) 105, a mobile switch (MSC) 106 having a time-division switch (TDNW) 107, a call processor (CP) 108 and an inter-working function device (PRV-IWF) 109 for provider connection, and an access server (AS: Access Server) 110. In the figure, 111 is an internet service provider (ISP), and 112 is an internet (Internet).

The above-described arrangement will be mentioned in detail, and the communication terminal on a mobile device side (DTE) 101 is a data terminal (PC) connected to a mobile device, that is, to the mobile communication terminal (MS) 103 via the adapter for mobile data communication (MS-ADP) 102. The mobile communication terminal (MS) 103, the wireless base station (BTS) 104, the wireless base station controller (BSC) 105, and the mobile switch (MSC) 106 are elements constituting the mobile communication system.

The mobile switch (MSC) 106 is connected to the internet service provider (ISP) 111 via the inter-working function device (PRV-IWF) 109 for provider connection and the access server (an asynchronous serial-LAN protocol converter) 110, and forms the interface with the internet network 112. The access server (AS) 110 is an interface device between a serial communication line and an IP communication line.

More particularly, the mobile switch (MSC) 106 is constructed of the time-division switch (TDNW) 107, the call processor (CP) 108 and the inter-working function device (PRV-IWF) 109 for provider connection. The inter-working function device (PRV-IWF) for provider connection, which is mentioned here, may be any of a device having any one of functions in a PRV-IWF (the first embodiment) and a PRV2-IWF (a second embodiment), and a device having both functions of the PRV-IWF and the PRV2-IWF.

The interface between a TCP/IP network on a side of the internet 112 and a mobile communication network is made by the access server (AS) 110. Data communication channels between the TCP/IP data communication terminal on a side of the internet 112 through the access server (AS) 110 and the communication terminal on a mobile device side (DTE) 101 (TCP/IP data terminal) on a mobile communication system side are connected by way of the wireless base station controller (BSC) 105, the wireless base station (BTS) 104, the mobile communication terminal (MS) 103 and the adapter for TCP/IP data communication on a mobile device side (MS-ADP) 102 under control of the call processor (CP) of the mobile switch (MSC) 106.

Figure 2:
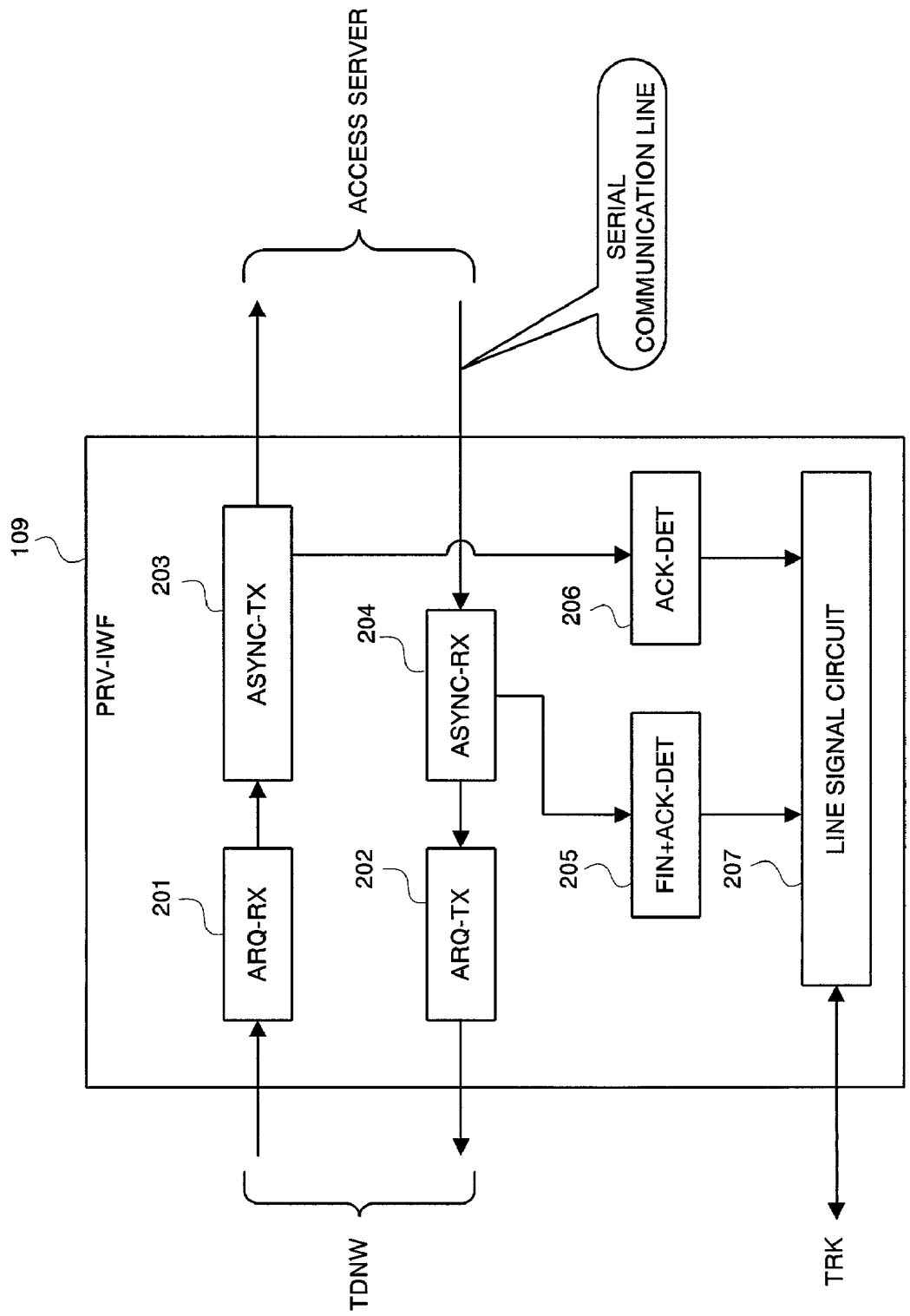
FIG. 2 is a block diagram showing a detailed arrangement of an inter-working function device (PRV-IWF) for provider connection in the mobile communication system in the first embodiment of the present invention.

Also, as shown in FIG. 2, the above-described inter-working function device (PRV-IWF) 109 for provider connection includes an ARQ-RX circuit 201, an ARQ-TX circuit 202, an ASYNC-TX circuit 203, an ASYNC-RX circuit 204, an FIN+ACK-DET circuit 205, an ACK-DET circuit 206, and a line signal transmitting and receiving circuit (Line Signal Circuit) 207.

The above-described arrangement will be mentioned in detail, and the ARQ-RX circuit 201 and the ARQ-TX circuit 202 are circuits for terminating a transmission error control protocol on a wireless line side. The ASYNC-TX circuit 203 and the ASYNC-RX circuit 204 are circuit for terminating communication on the serial communication line with the access server (AS) 110 on an ISP side.

The FIN+ACK-DET circuit 205 monitors user data sent from the access server (AS) 110 on an ISP side to the ARQ-TX circuit 202 via the ASYNC-RX circuit 204, and detects an FIN+ACK message that is a TCP/IP communication establishment sequence out of TCP protocol messages in a TCP/IP packet, and outputs it to the line signal transmitting and receiving circuit 207.

The ACK-DET circuit 206 monitors user data sent from a wireless line side to the ASYNC-TX circuit 203 via the ARQ-RX circuit 201, and detects an ACK message that is a TCP/IP communication disconnection sequence out of the TCP protocol messages in the TCP/IP packet, and outputs it to the line signal transmitting and receiving circuit 207.

The line signal transmitting and receiving circuit 207 determines an end of a data transfer in which TCP/IP is used, based on the FIN+ACK message from the FIN+ACK-DET circuit 205 and the ACK message from the ACK-DET circuit 206, and if the data transfer ends, it sends the mobile switch (MSC) 106 a release demand signal (RLS) that instructs the release of the communication channels of such an inter-working function device (PRV-IWF) 109 for provider connection and the PRV-IWF itself.

(2) Explanation of Operation

Next, referring to FIG. 1 to FIG. 3, the operation of the first embodiment of the present invention will be explained in detail.

In the inter-working function device (PRV-IWF) 109 for provider connection, the FIN+ACK-DET circuit 205 detects a message (denoted as an "FIN+ACK message", hereinafter) in which an FIN flag is true and an ACK flag is true, out of the TCP protocol messages in the TCP/IP packet, which arrive via the serial communication line from the TCP/IP data communication terminal on an access server side. This FIN+ACK message is a message that is transmitted and received between the TCP/IP data communication terminals when a data transfer in which TCP connection is used ends, and the TCP connection is released.

The ACK-DET circuit 206 detects a message (denoted as an "ACK message", hereinafter) that is a confirmation response signal for the above-described FIN+ACK message and is transmitted and received between the TCP/IP data communication terminals when the data transfer in which the TCP connection is used ends, and the TCP connection is released, and in which an ACK flag is true, out of the TCP protocol messages in the TCP/IP packet, which arrive from the communication terminal on a mobile device side (DTE) 101 (the TCP/IP data communication terminal) via a wireless line, an approach link and the mobile switch (MSC) 106.

In case that a logical product of the above-described FIN+ACK message and the above-described ACK message is true, the line signal transmitting and receiving circuit 207 sends the mobile switch (MSC) 106 a release demand signal (RLS) that instructs the release of the communication channels of such an inter-working function device (PRV-IWF) 109 for provider connection and the PRV-IWF itself. Also, the line signal transmitting and receiving circuit 207 receives a release protection signal (RLSG) that is a confirmation response signal from a mobile switch side of the above-described release demand signal (RLS).

Figure 3:
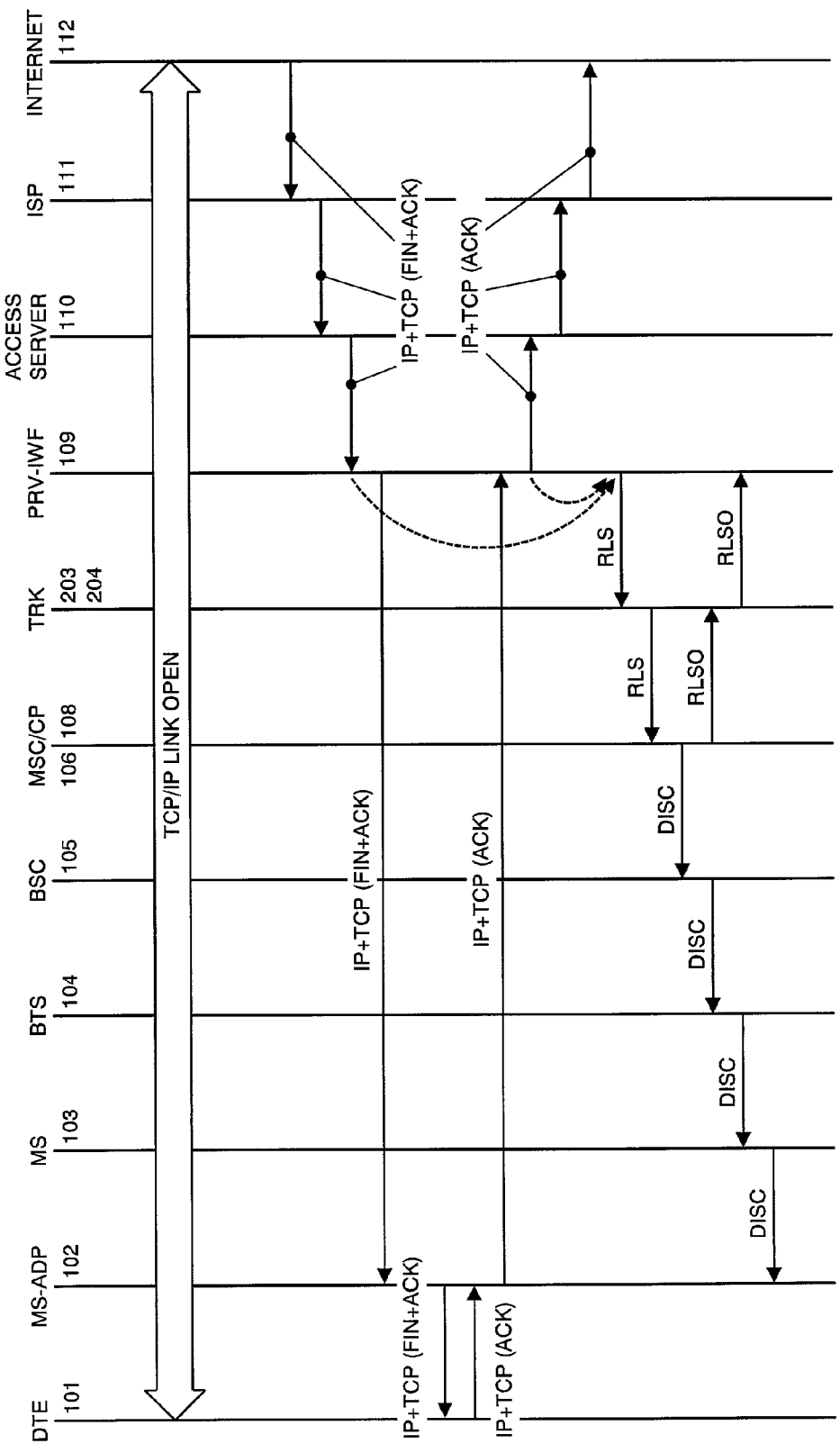
FIG. 3 is an explanatory view showing a signal sequence in the mobile communication system in the first embodiment of the present invention.

A signal sequence in the mobile TCP/IP data communication system in which the inter-working function device (PRV-IWF) 109 for provider connection is used is shown in FIG. 3.

As shown in FIG. 3, when receiving the FIN+ACK message indicating an end of the data transfer from a side of the internet 112 via the ISP 111 and the AS 110 during mobile TCP/IP communication (when a TCP/IP link is open), the PRV-IWF 109 stores the FIN+ACK message in the PRV-IWF 109, and transfers it to the DTE 101 by way of the MSC 106, the BSC 105, the BTS 104, the MS 103 and the MS-ADP 102.

The DTE 101 that has received the FIN+ACK message from a side of the internet 112 sends the ACK message towards the internet 112 as a response of the FIN+ACK message. On the way, the PRV-IWF 109 detects this ACK message and stores it in the PRV-IWF 109.

At this time, since a logical product of the detection results of the FIN+ACK message from a side of the internet 112 and the ACK message from a side of the DTE 101 becomes true, in order to release the communication channels of all devices related to this TCP/IP communication and the PRV-IWF 109 itself, the PRV-IWF 109 sends a release demand signal (RLS) to the CP 108 of the MSC 101 via the TRK 203 or 204 that is generally provided in the switch.

The PRV-IWF 109 releases the PRV-IWF 109 itself and prepares itself for next coming TCP/IP communication by receiving a release protection signal (RLSG) that is a confirmation response signal from a mobile switch side of the above-described release demand signal (RLS) via the TRK 203 or 204.

The CP 108 of the MSC 101 sends the above-described release protection signal (RLSG), and sends a disconnection signal (DISC) for releasing the communication channels that are being used for this TCP/IP communication of the BSC 105, the BTS 104, the MS 103 and the MS-ADP 102.

As explained above, according to the first embodiment of the present invention, (1) in the inter-working function device (PRV-IWF) 109 for provider connection, by detecting the FIN+ACK message and the ACK message of the FIN flag TCP out of the TCP protocol messages in the TCP/IP packet, it is possible to detect an end of the data transfer in which the TCP connection is used, and a release demand of the TCP connection.

(2) Accordingly, it becomes possible to release such devices and communication channels in which the data transfer is not conducted, that is, during non-communication.

Second Embodiment

Next, referring to drawings, a second embodiment of the present invention will be explained in detail.

(1) Explanation of an Arrangement

Figure 4:
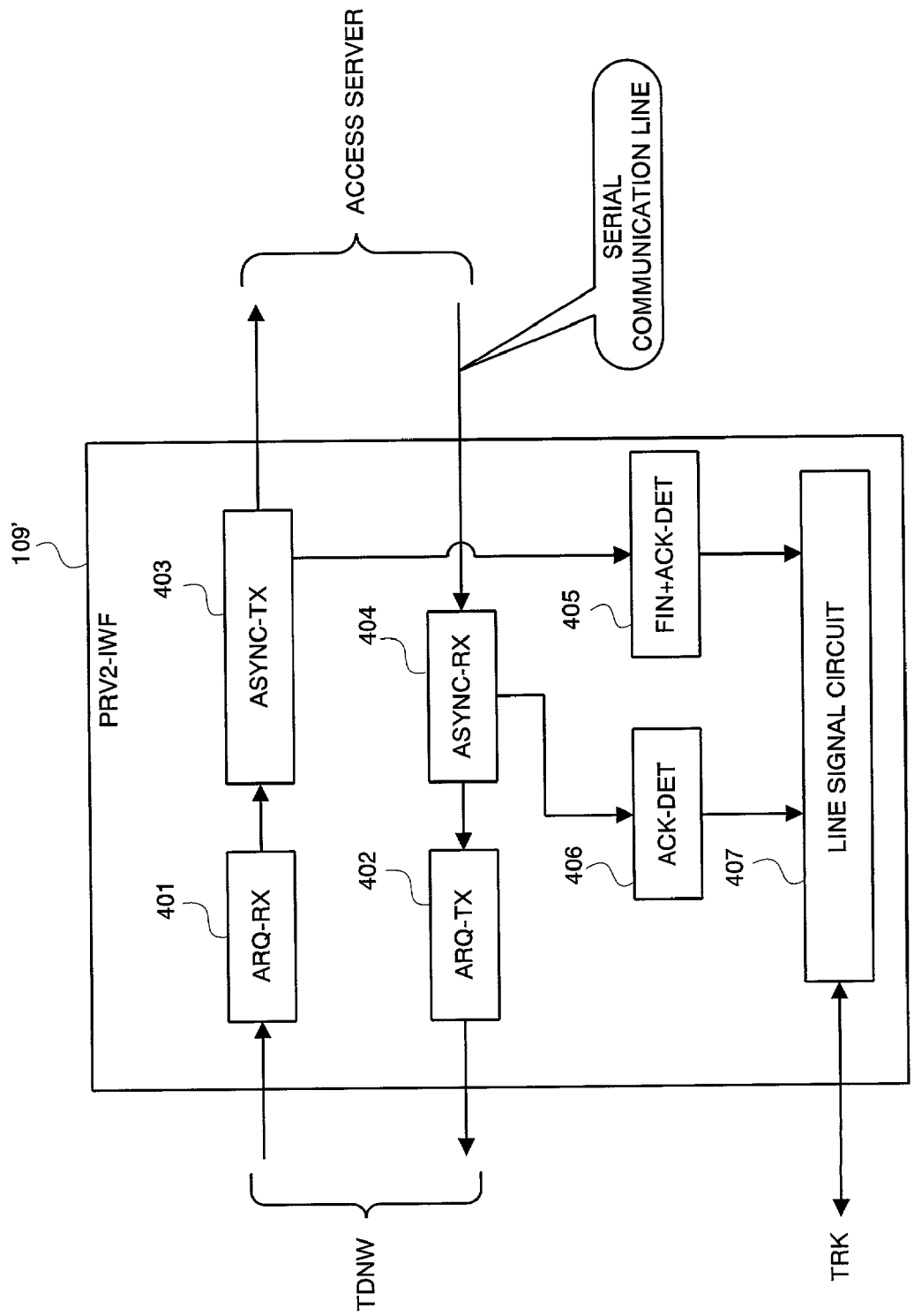
FIG. 4 is a block diagram showing a detailed arrangement of an inter-working function device (PRV-IWF) for provider connection in a mobile communication system in the second embodiment of the present invention.

As shown in FIG. 4, the inter-working function device (PRV2-IWF) 109' for provider connection of a mobile communication system in the second embodiment of the present invention includes an ARQ-RX circuit 401, an ARQ-TX circuit 402, an ASYNC-TX circuit 403, an ASYNC-RX circuit 404, an FIN+ACK-DET circuit 405, an ACK-DET circuit 406, and a line signal transmitting and receiving circuit (Line Signal Circuit) 407.

The constitution elements of the inter-working function device (PRV2-IWF) 109' for provider connection in the second embodiment of the present invention are the same as those in the inter-working function device (PRV-IWF) 109 for provider connection of the above-described first embodiment, and only difference therebetween is a direction of the TCP/IP packet to be monitored. In other words, in the second embodiment, the FIN+ACK-DET circuit 405 is connected between the ASYNC-TX circuit 403 and the line signal transmitting and receiving circuit 407, and the ACK-DET circuit 406 is connected between the ASYNC-RX circuit 404 and the line signal transmitting and receiving circuit 407.

(2) Explanation of Operation

Next, referring to FIG. 4 and FIG. 5, the operation of the second embodiment of the present invention will be explained in detail.

In the inter-working function device (PRV2-IWF) 109' for provider connection, the FIN+ACK-DET circuit 405 detects a message that is transmitted and received between the TCP/IP data communication terminals when the data transfer in which the TCP connection is used ends, and the TCP connection is released, and in which an FIN flag is true and an ACK flag is true, out of the TCP protocol messages in the TCP/IP packet, which arrive from the TCP/IP data communication terminal (DTE) on a mobile device side via a wireless line, an approach link and the mobile switch (MSC).

The ACK-DETcircuit 406 detects a message that is a confirmation response signal for the above-described FIN+ACK message, and in which an ACK flag is true, out of the TCP protocol messages in the TCP/IP packet, which arrive from the TCP/IP data communication terminal on an access server side via the serial communication line when the data transfer in which the TCP connection is used ends, and the TCP connection is released.

In case that a logical product of the above-described FIN+ACK message and the above-described ACK message is true, the line signal transmitting and receiving circuit 407 sends the mobile switch a release demand signal (RLS) that instructs the release of the communication channels of such an inter-working function device (PRV2-IWF) 109' for provider connection and the PRV-IWF itself. Also, the line signal transmitting and receiving circuit 407 receives a release protection signal (RLSG) that is a confirmation response signal from a mobile switch side of the above-described release demand signal (RLS).

Figure 5:
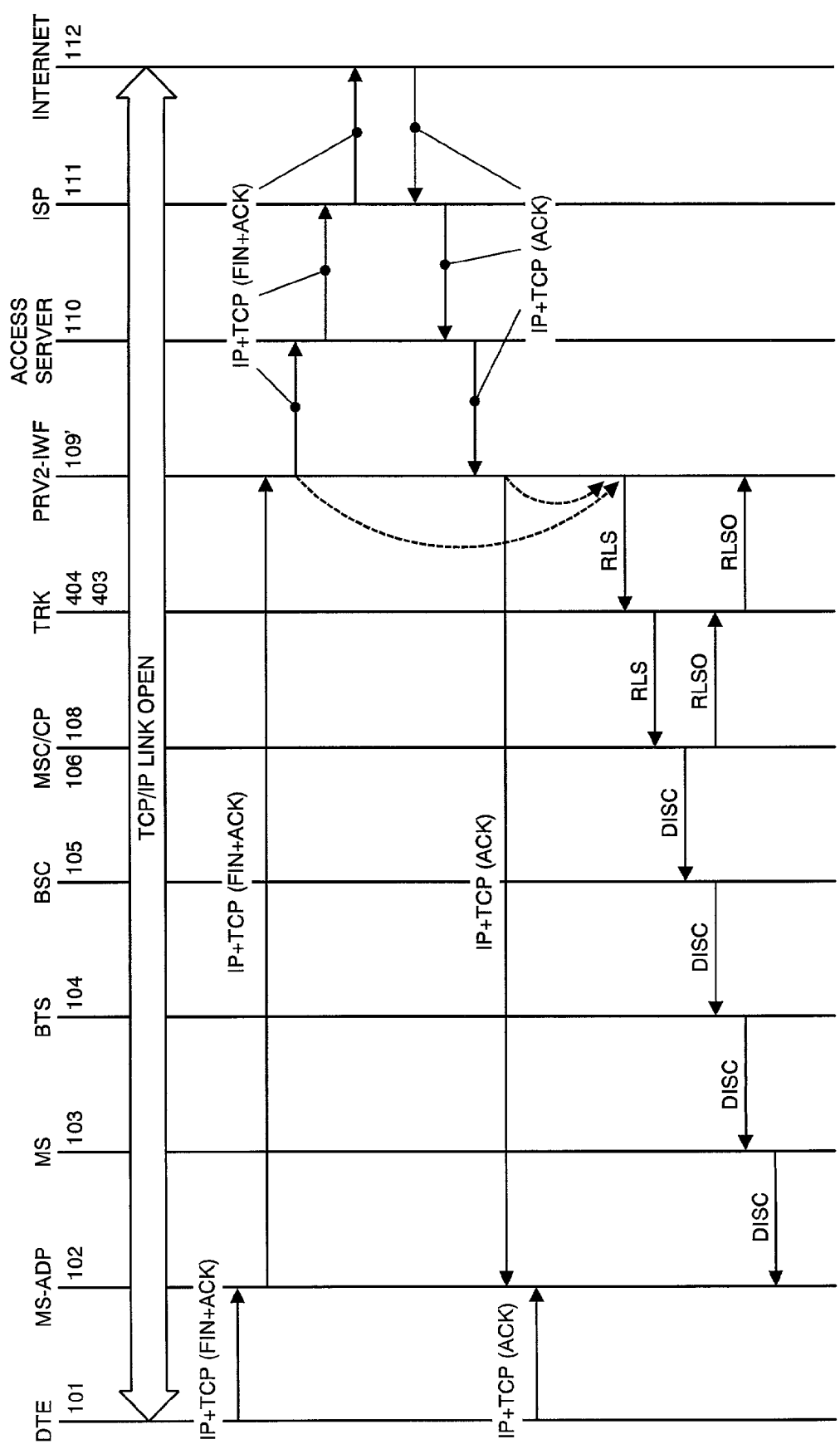
FIG. 5 is an explanatory view showing a signal sequence in the mobile communication system in the second embodiment of the present invention.
Figure 6:
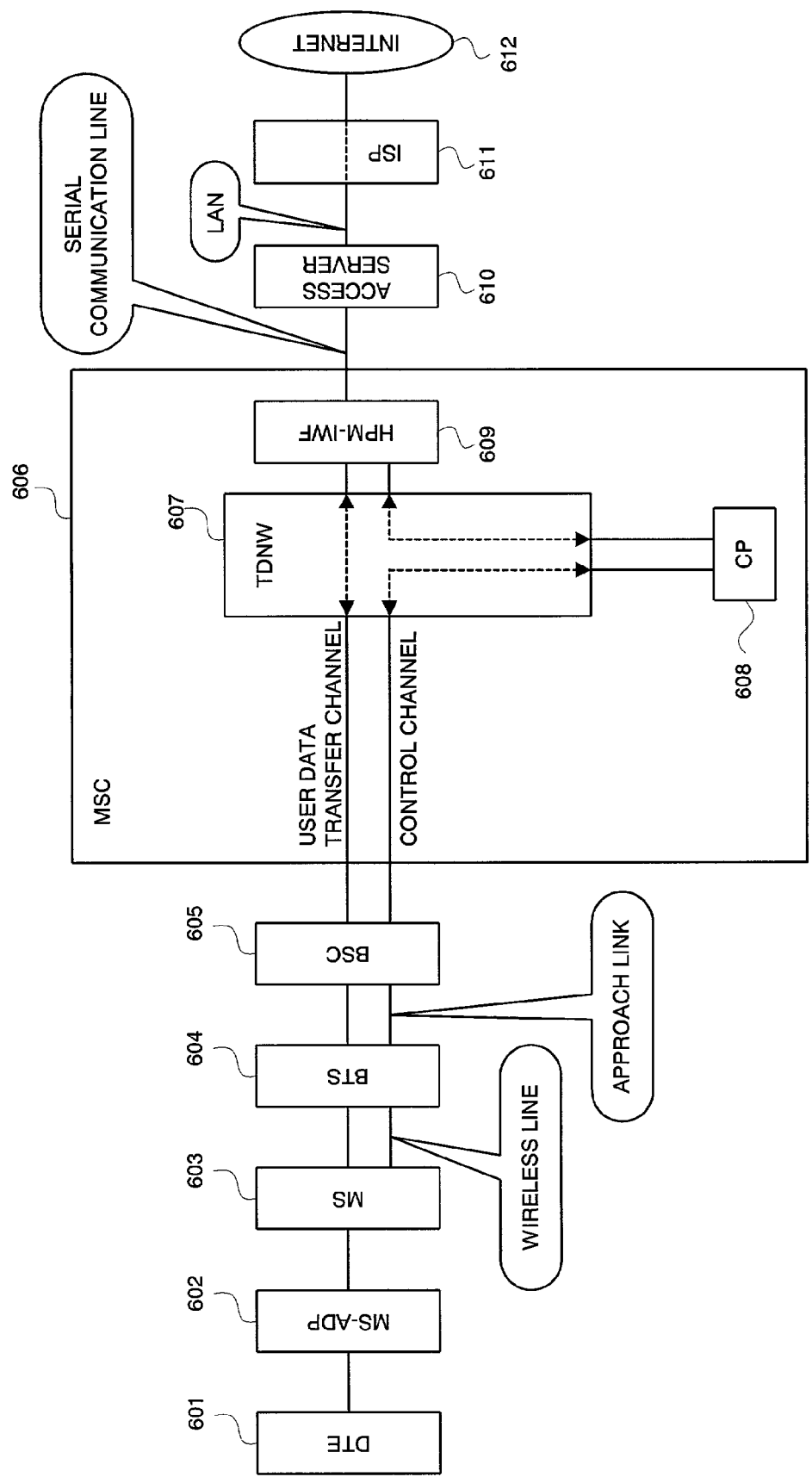
FIG. 6 is a block diagram showing a whole arrangement of a mobile communication system in a conventional example.
Figure 7:
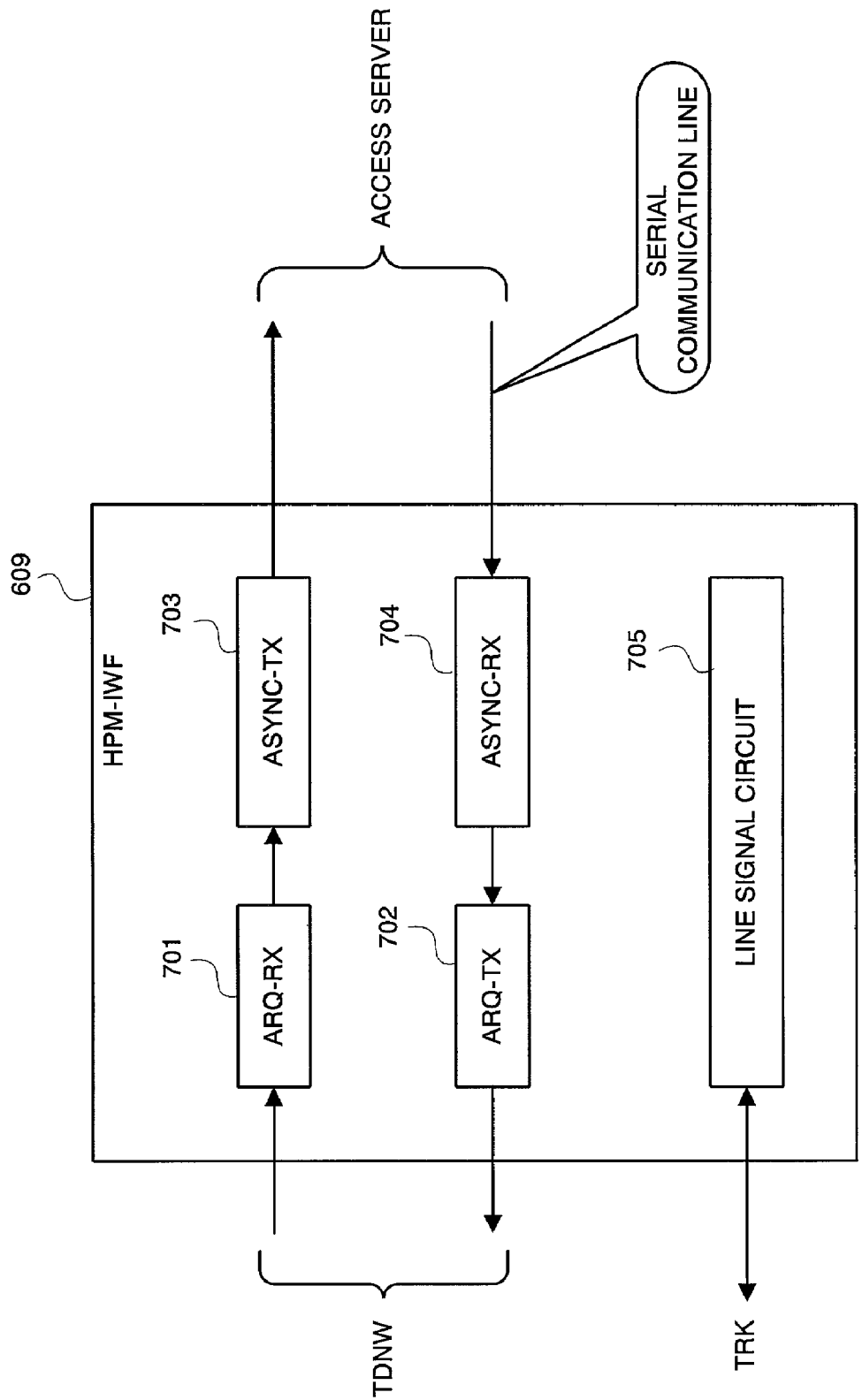
FIG. 7 is a block diagram showing a detailed arrangement of an inter-working function device (HPM-IWF) in the mobile communication system of the conventional example.

A signal sequence of the mobile TCP/IP data communication system in which the inter-working function device (PRV2-IWF) 109' for provider connection is used is shown in FIG. 5.

As shown in FIG. 5, this embodiment operates like the embodiment 1 (FIG. 3) other than that the FIN+ACK message indicating an end of the data transfer first is sent from a side of the DTE 101, and the ACK message corresponding thereto is sent from a side of the internet 112.

As explained above, according to the second embodiment of the present invention, like in the above-described first embodiment, it is possible to release the communication channels during non-communication of the TCP/IP data communication.

As explained above, according to the present invention, since it is possible to release the communication channels during non-communication of the mobile TCP/IP data communication, the advantages described below can be effected.

As the first advantage, it becomes possible to effectively use a finite radio frequency band that is used by the mobile communication system.

As the second advantage, by means of a statistical multiplexing effect in the TCP/IP data communication, it is possible to reduce the number of the devices for data communication, which are provided in the mobile switch.

What is claimed is:

1. An apparatus for provider connection, in a mobile communication system including a communication terminal on a mobile device side, a mobile device, an adapter for mobile data communication, a mobile switch and an access server, which is provided in said mobile switch, wherein the apparatus comprises:
    a first detection circuit for discriminating a message in a TCP/IP packet sent from said access server and detecting an end of data transfer;
    a second detection circuit for discriminating a message in a TCP/IP packet sent from said communication terminal on a mobile device side, which is connected to said mobile device and said adapter for mobile data communication, and detecting that said communication terminal on a mobile device side has recognized an end of data transfer; and
    a line signal transmitting and receiving circuit for providing an indication to said mobile switch via a signal repeating device based on detection results of said first and said second detection circuits to release talking channels for TCP/IP data communication within a mobile communication network.

2. An apparatus for provider connection recited in claim 1, wherein said access server is an interface device between a serial communication line and an internet protocol communication line, and is a device provided on a side of an internet service provider, and
    in case that a value of a logical product of the detection results of said first and said second detection circuits is true, said line signal transmitting and receiving circuit provides an indication to said mobile switch via said signal repeating device to release the talking channels for TCP/IP data communication within said mobile communication network.

3. An apparatus for provider connection recited in claim 1, further comprising means for releasing talking channels for TCP/IP data communication within said mobile communication network when the data transfer of TCP/IP data communication ends.

4. An apparatus for provider connection, in a mobile communication system including a communication terminal on a mobile device side, a mobile device, an adapter for mobile data communication, a mobile switch and an access server, which is provided in said mobile switch, wherein the apparatus comprises:
    a first detection circuit for discriminating a message in a TCP/IP packet sent from said communication terminal on a mobile device side, which is connected to said mobile device and said adapter for mobile data communication, and detecting an end of data transfer;
    a second detection circuit for discriminating a message in a TCP/IP packet sent from said access server and detecting that a communication terminal on an internet side has recognized an end of data transfer; and
    a line signal transmitting and receiving circuit for providing an indication to said mobile switch via a signal repeating device based on detection results of said first and said second detection circuits to release talking channels for TCP/IP data communication within a mobile communication network.

5. An apparatus for provider connection recited in claim 4, wherein said access server is an interface device between a serial communication line and an internet protocol communication line, and is a device provided on a side of an internet service provider, and
    in case that a value of a logical product of the detection results of said first and said second detection circuits is true, said line signal transmitting and receiving circuit provides an indication to said mobile switch via said signal repeating device to release the talking channels for TCP/IP data communication within said mobile communication network.

6. An apparatus for provider connection recited in claim 4, further comprising means for releasing talking channels for TCP/IP data communication within said mobile communication network when the data transfer of TCP/IP data communication ends.

7. A mobile communication system including a communication terminal on a mobile device side, a mobile device, an adapter for mobile data communication, a mobile switch and an access server, wherein an apparatus for provider connection, which is provided in said mobile switch, comprises:
    a first detection circuit for discriminating a message in a TCP/IP packet sent from said access server and detecting an end of data transfer;
    a second detection circuit for discriminating a message in a TCP/IP packet sent from said communication terminal on a mobile device side, which is connected to said mobile device and said adapter for mobile data communication, and detecting that said communication terminal on a mobile device side has recognized an end of data transfer; and
    a line signal transmitting and receiving circuit for providing an indication to said mobile switch via a signal repeating device based on detection results of said first and said second detection circuits to release talking channels for TCP/IP data communication within a mobile communication network.

8. A mobile communication system recited in claim 7, wherein said access server is an interface device between a serial communication line and an internet protocol communication line, and is a device provided on a side of an internet service provider, and
    in case that a value of a logical product of the detection results of said first and said second detection circuits is true, said line signal transmitting and receiving circuit of said apparatus for provider connection provides an indication to said mobile switch via said signal repeating device to release the talking channels for TCP/IP data communication within said mobile communication network.

9. A mobile communication system recited in claim 7, further comprising means for releasing talking channels for TCP/IP data communication within said mobile communication network when the data transfer of TCP/IP data communication ends.

10. A mobile communication system including a communication terminal on a mobile device side, a mobile device, an adapter for mobile data communication, a mobile switch and an access server, wherein an apparatus for provider connection, which is provided in said mobile switch, comprises:
    a first detection circuit for discriminating a message in a TCP/IP packet sent from said communication terminal on a mobile device side, which is connected to said mobile device and said adapter for mobile data communication, and detecting an end of data transfer;

a second detection circuit for discriminating a message in a TCP/IP packet sent from said access server and detecting that a communication terminal on an internet side has recognized an end of data transfer; and a line signal transmitting and receiving circuit for providing an indication to said mobile switch via a signal repeating device based on detection results of said first and said second detection circuits to release talking channels for TCP/IP data communication within a mobile communication network.

11. A mobile communication system recited in claim 10, wherein said access server is an interface device between a serial communication line and an internet protocol communication line, and is a device provided on a side of an internet service provider, and in case that a value of a logical product of the detection results of said first and said second detection circuits is true, said line signal transmitting and receiving circuit of said apparatus for provider connection provides an indication to said mobile switch via said signal repeating device to release the talking channels for TCP/IP data communication within said mobile communication network.

12. A mobile communication system recited in claim 10, further comprising means for releasing talking channels for TCP/IP data communication within said mobile communication network when the data transfer of TCP/IP data communication ends.

13. A mobile TCP/IP data communication method in a mobile communication system including a communication terminal on a mobile device side, a mobile device, an adapter for mobile data communication, a mobile switch and an access server, wherein:

a message in a TCP/IP packet sent from said access server is discriminated, and an end of data transfer is detected;

a message in a TCP/IP packet sent from said communication terminal on a mobile device side, which is connected to said mobile device and said adapter for mobile data communication, is discriminated, and it is detected that said communication terminal on a mobile device side has recognized an end of data transfer; and in case that a value of a logical product of the detection results of said first and said second detection circuits is true, an indication is provided to said mobile switch via a signal repeating device to release talking channels for TCP/IP data communication within a mobile communication network.

14. A mobile TCP/IP data communication method in a mobile communication system including a communication terminal on a mobile device side, a mobile device, an adapter for mobile data communication, a mobile switch and an access server, wherein:

a message in a TCP/IP packet sent from said communication terminal on a mobile device side, which is connected to said mobile device and said adapter for mobile data communication, is discriminated, and an end of data transfer is detected;

a message in a TCP/IP packet sent from said access server is discriminated, and it is detected that a communication terminal on an internet side has recognized an end of data transfer; and in case that a value of a logical product of the detection results of said first and said second detection circuits is true, an indication is provided to said mobile switch via a signal repeating device to release talking channels for TCP/IP data communication within a mobile communication network.

* * * * *